United States Patent [19]
DeWitt et al.

[11] Patent Number: 4,999,796
[45] Date of Patent: Mar. 12, 1991

[54] STICKY BIT DETECTION AND SHIFTING LOGIC

[75] Inventors: Bernard C. DeWitt; Ying-wai Ho, both of Austin, Tex.

[73] Assignee: Motorola, Inc., Schaumburg, Ill.

[21] Appl. No.: 450,796

[22] Filed: Dec. 14, 1989

[51] Int. Cl.⁵ .......................... G06F 7/00; G06F 15/00
[52] U.S. Cl. ................................ 364/715.08; 364/736.5
[58] Field of Search ................. 364/715.08, 736.5, 748

[56] References Cited

U.S. PATENT DOCUMENTS

| | | | |
|---|---|---|---|
| 4,383,304 | 5/1983 | Hirashima | 364/715.08 |
| 4,509,144 | 4/1985 | Palmer et al. | 364/715.08 |
| 4,864,527 | 9/1989 | Peng et al. | 364/748 |
| 4,887,232 | 12/1989 | Wolrich et al. | 364/715.08 |
| 4,901,263 | 2/1990 | Ho et al. | 364/715.08 |

Primary Examiner—Dale M. Shaw
Attorney, Agent, or Firm—Robert L. King

[57] ABSTRACT

A circuit which concurrently performs bit shifting for floating point arithmetic and sticky bit determination. An input data operand is presented to the circuit along with a control signal which determines the number of digit positions to be shifted. While shifting of bits occurs to provide a shifted output operand, detection of bits which are shifted off from the output operand for the presence of sticky bits occurs. A shifted output operand and a sticky bit detect signal are provided substantially concurrently. An efficient layout of the circuit significantly minimizes the area required to implement both functions.

7 Claims, 3 Drawing Sheets

FIG. 1 —PRIOR ART—

STICKY BIT DETECTION AND SHIFTING LOGIC

TECHNICAL FIELD

This invention relates to data processing systems, and more particularly, to data processing systems capable of executing floating point operations.

BACKGROUND OF THE INVENTION

Shifting of a large number of bits is typically required in data format conversions, cordic approximations and denormalization operations. The term "sticky bit" is a term commonly associated with an IEEE standard for binary floating point arithmetic where a "sticky bit" is the result of a logical OR of any bits which are discarded as the result of a right shift operation of a data operand. Such a shift operation is commonly performed when aligning two operands for floating point addition or subtraction. Detection of any bits having a logic one value which are shifted off from the resulting operand is valuable information which can be used to improve the precision of an instruction commanding a floating point unit to add or subtract two operands in floating point format. In particular, the sticky bit is used to determine whether or not the resultant operand should be rounded up in order to retain precision. Previous floating point units have used a large bit-size data shifting circuit to perform a right shift operation on the smaller of two operands. Subsequent to the shifting, a microcode software sequence is executed by a floating point unit to determine whether or not any of the bits shifted away from the smaller operand had a logic one value, thereby detecting the existence of a sticky bit. The microcode sequence is a multiple step sequence which significantly slows the floating point unit and is therefore undesirable.

Shown in U.S. Pat. No. 4,864,527 issued to Peng et al. and entitled "Apparatus and Method for Using a Single Carry Chain For Leading One Detection and For 'Sticky' Bit Calculation" is a hardware implementation of detecting a sticky bit in floating point processors. Logic circuitry is associated with each operand fraction position resulting in a significant propagation delay when large bit size operands are used. In addition, a large amount of logic circuitry and time is required to implement sticky bit detection when operands in the sixty-four bit range and greater are used and each bit position is implemented with its own circuitry in a serial architecture.

SUMMARY OF THE INVENTION

Accordingly, it is an object of the present invention to provide improved sticky bit detection and shifting circuitry for use in floating point arithmetic calculations.

Another object of the present invention is to provide an improved method and apparatus for use in adding or subtracting numbers in floating point format.

Yet another object of the present invention is to provide an improved physical layout of a circuit for performing both sticky bit detection and bit shifting to implement a floating point arithmetic calculation.

In carrying out the above and other objects of the present invention, there is provided, in one form, a method and circuit for implementing a sticky bit detection and an operand bit shifting function. The circuit comprises a plurality of data input terminals for receiving an input operand having a first predetermined number of bits, and a plurality of control terminals. Each control terminal receives a control signal defining a second predetermined number of bit positions of the input operand which are to be shifted. A first circuit portion is coupled to both the plurality of data input terminals and the plurality of control terminals, for providing an output signal indicating the detection of any bit having a logic one value within the second predetermined number of bits. A second circuit portion is coupled to the first circuit portion and to the plurality of data input terminals and control terminals. The second circuit portion provides a shifted output data operand derived from the input operand by shifting the first predetermined number of bits the second predetermined number of bit positions. The output detect signal is provided within a time period required to provide the shifted output data operand.

These and other objects, features, and advantages, will be more clearly understood from the following detailed description taken in conjunction with the accompanying drawings.

DETAILED DESCRIPTION OF THE INVENTION

Figure 1:
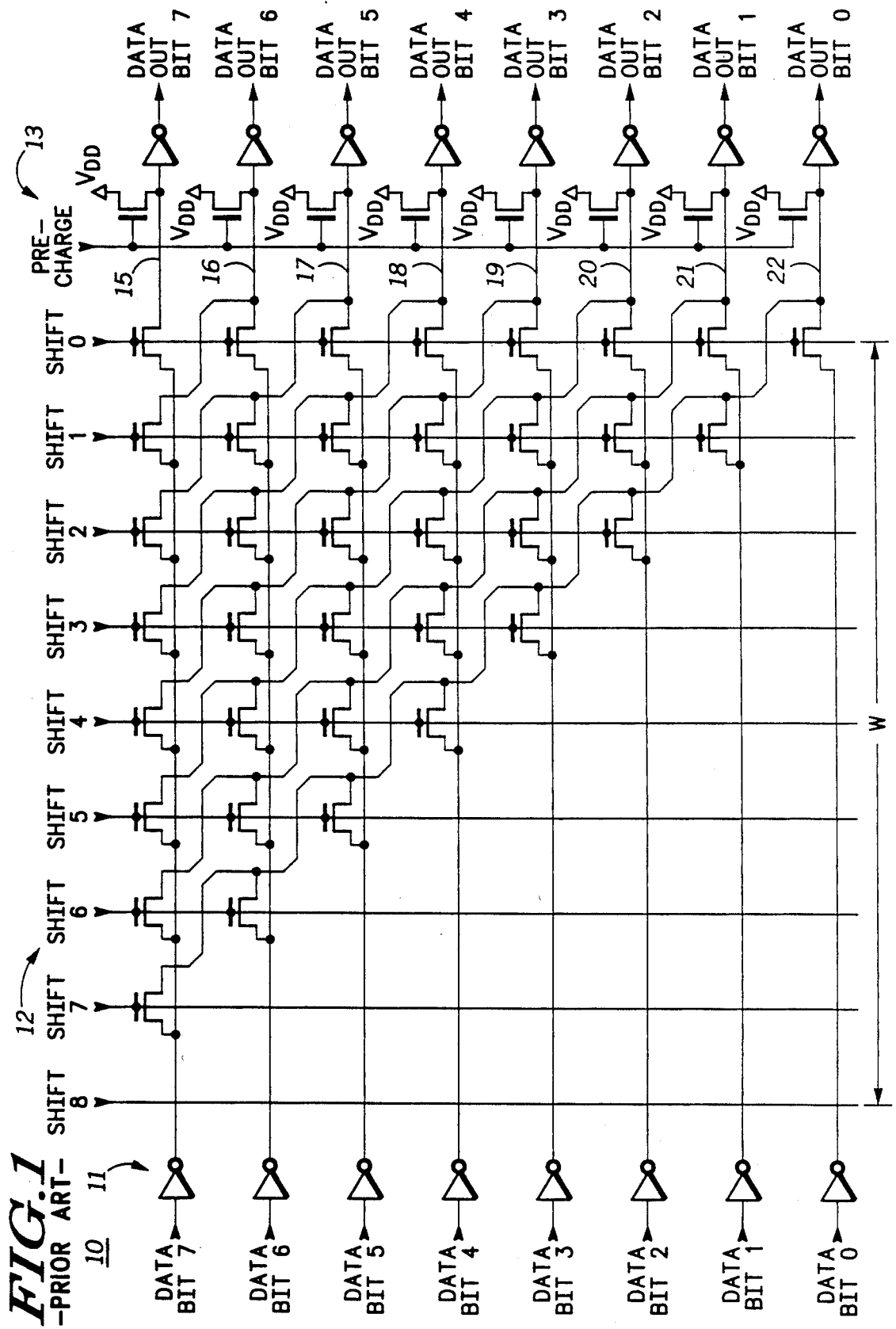
FIG. 1 illustrates in partial schematic form a known data shifting circuit.

Shown in FIG. 1 is a known data shifting circuit 10 for shifting bits of a data operand by a controlled number of bit positions. For ease of illustration, an eight-bit implementation utilizing N-channel transistors is shown. Data shifting circuit 10 generally comprises an input portion 11, a controlled shift portion 12 and an output portion 13.

In the illustrated form, eight bits of an input data operand are respectively inputted into eight input terminals of input portion 11. Controlled shift portion 12 has an array of transistors which form ranked rows and columns of transistors. Each column and row which is formed has either a predetermined number of transistors or a single transistor. In the illustrated form, eight rows of transistors are provided corresponding in number to the number of bits of the input data operand. Nine columns of transistors are formed which corresponds in number to the number of bits of the input data operand plus one. The controlled shift portion 12 is connected to the output portion 13 at each of terminals 15–22. Nine shift control signals labeled "Shift 0" thru "Shift 8" are connected to controlled shift portion 12. The shift control signals control a shift of bits of the input data operand by a predetermined number of bits depending upon which shift control signal is asserted. Output portion 13 has eight precharge transistors which each precharge transistor respectively precharging an input of a predetermined one of eight inverters to a high logic value so that each data output of output portion 13 is initialized to a logic low.

In operation, the precharge signal is selectively asserted to initially force all output terminals to a logic low. After the input data operand is presented to input portion 11, a single one of the nine shift signals is asserted in controlled shift portion 12. The transistors of controlled shift portion 12 are configured so as to effectively implement either no shift or a shift of up to eight bits as indicated by all logic zeroes at the output terminals. When no shift occurs, the input data bits are physically coupled thru the controlled shift portion 12 and outputted by output portion 13 so that the output bits directly correspond to the input bits as labeled in FIG. 1. When a bit shift, of four bits for example, occurs the controlled shift portion 12 functions to physically route the most significant input bit, data bit 7, down four bit positions to the "Data Out Bit 3" position. In such an example, the less significant data bits which are shifted off the output data operand do not appear at the outputs of output portion 13. In this example, data input bits 3, 2, 1 and 0 are never physically connected to output portion 13 at terminals 19, 20, 21 and 22, respectively, via controlled shift portion 12. Therefore, an input data operand is readily shifted a controlled number of bit positions.

As shown in FIG. 1 it should be readily apparent that the functionality of the columns and rows of data shifting circuit 10 results in a circuit structure which does not lend itself to a compact size and layout. In particular, there is a large amount of unused area within the transistor array forming controlled shift portion 12. Controlled shift portion 12 of data shifting circuit 10 has some fixed width, W, between the multiple inputs of input portion 11 to the multiple outputs of output portion 13. As the transistor array within controlled shift portion 12 is implemented laterally from left to right, a substantial amount of unused circuit area is created in the transistor array. As illustrated in FIG. 1, the unused circuit portion is approximately fifty percent of the transistor array of controlled shift portion 12. As bit size implementations are increased, the layout and size inefficiency only becomes more critical. Further, a potential solution for minimizing the unused area by trying to wrap some of the circuitry around into the unused portion is not generally a viable solution in large bit implementations. In such a proposed alternative, increased complexity in additional routing and physical layout results from moving transistors of one column into another column for size compacting reasons makes efficient useage of the empty array impractical. Testing and manufacturing costs also increase when transistor array circuitry is nonuniform in structure. As a result, when data shifting circuit 10 of FIG. 1 is implemented in a semiconductor material such as silicon, many transistor "holes" or absences exist in the array control portion 12 resulting in a mask layer which does not even visually appear to be efficiently utilized. An additional disadvantage associated with the structure of data shifting circuit 10 worth noting is the fact that there is uneven loading associated with each shift control signal line in controlled shift portion 12. As a result, driver circuitry which can handle varying current drive requirements must be provided.

Figure 2:
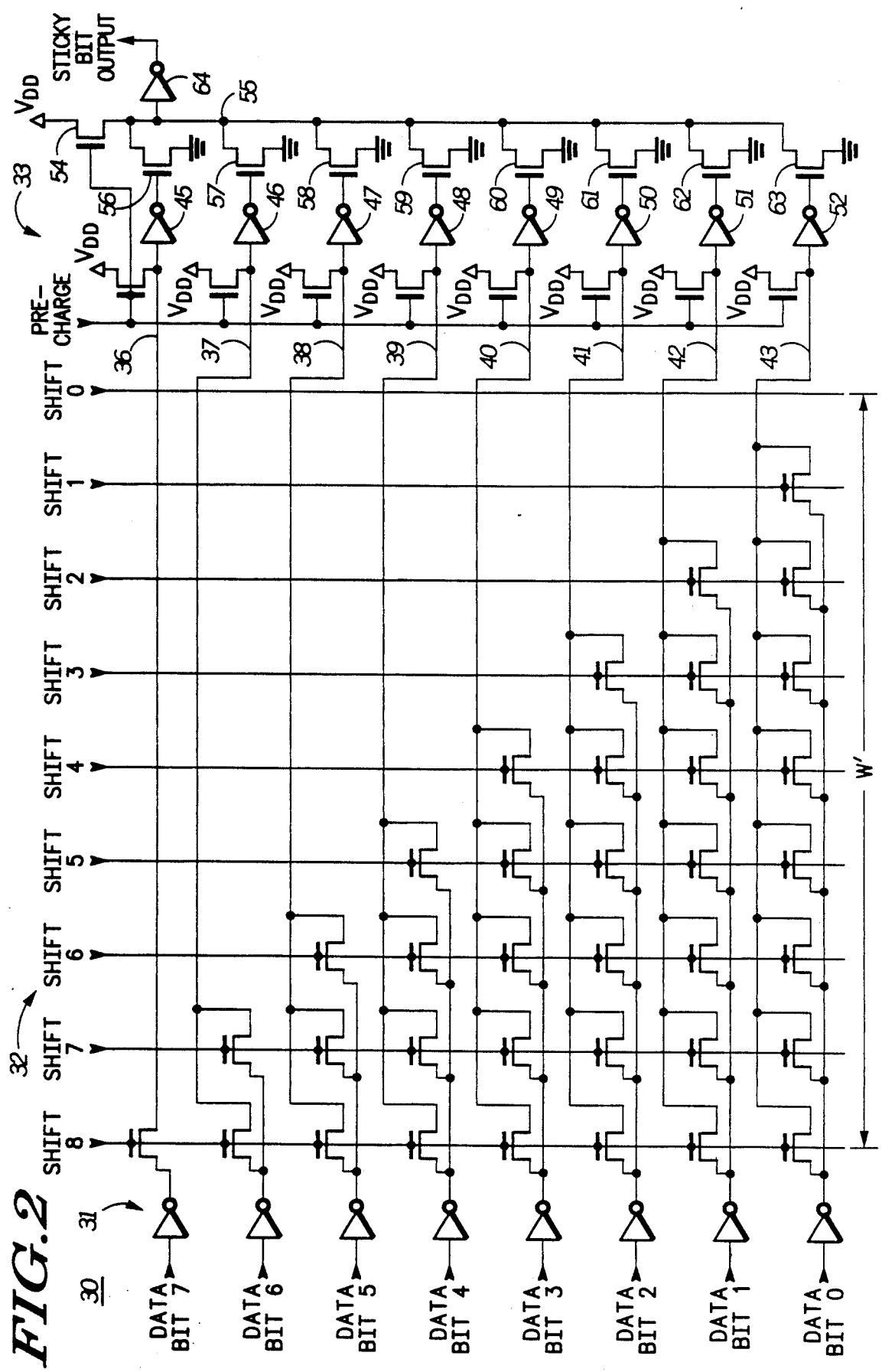
FIG. 2 illustrates in partial schematic form a circuit for detecting existence of sticky bits when a data operand shifting operation occurs.

Shown in FIG. 2 is a sticky bit detection circuit 30 for detecting the presence of any sticky bits in a portion of a data operand which is shifted off of the resulting shifted data output operand. For purposes of convenience, an eight-bit implementation is again illustrated. Detection circuit 30 generally has an input portion 31, a control portion 32 and an output portion 33. Input portion 31 has a plurality of input terminals, each of which is connected to an input of an inverter, not numbered.

An output of each inverter is connected to control portion 32. Each input terminal receives a predetermined bit of an eight-bit data operand as illustrated in FIG. 2. Control portion 32 has an array of N-channel transistors which form rank ordered rows and columns. As illustrated, each row of transistors from top to bottom has one more transistor in the row than the row immediately above. Each transistor of control portion 32 has a gate connected to a predetermined one of a plurality of shift control signals. In the illustrated form, nine shift signals are provided for an eight-bit implementation so that a shift of anywhere in a range of from no bits to eight bits may be implemented. In the illustrated form, a source of each N-channel transistor of each row of the array is connected together. All sources of each row's transistors are respectively connected together and to one of a plurality of inputs 36–43 of output portion 33. Output portion 33 has a plurality of pull-up transistors, not numbered, which are each controlled by a Precharge signal wherein each pull-up transistor is connected to a predetermined one of the inputs 36–43. Each of inputs 36–43 is respectively connected to an input of one of a plurality of inverters 45–52. A precharge transistor 54 is connected between a power supply voltage $V_{DD}$ and an output node 55, and has a gate connected to the Precharge signal. Each of inverters 45–52 has an output respectively connected to a gate of one of a plurality of pull-down transistors 56–63 for selectively connecting output node 55 to a ground potential. An inverter 64 has an input connected to output node 55, and has an output for providing a Sticky Bit output signal indicating the detection of a sticky bit.

In operation, sticky bit detection circuit 30 receives an input operand and a shift control signal and provides an output signal which indicates whether or not any sticky bits were detected as a result of a bit shifting operation. Initially, the Precharge signal is asserted which makes the outputs of each of inverters 45–52 have a logic low value thereby making each of transistors 56 thru 63 nonconductive. Transistor 54 is simultaneously made conductive which makes the sticky bit output signal have a logic low value. After the precharge signal is made nonassertive, eight data bits are coupled to detection circuit 30 and one shift signal is asserted. Control portion 32 functions to couple whatever bits which are actually shifted off from the data operand to be coupled to a respective inverter input of output portion 33. If any of the bits which are shifted off of the data operand has a logic one value, output portion 33 functions to couple a ground potential to output node 55 thereby causing the sticky bit output signal to transition to a logic high. For example, when a shift of four bits occurs, the logic values of input data bits 0, 1, 2 and 3 are respectively connected to the inputs of inverters 52, 51, 50 and 49. If any of these shifted off bits has a logic one value, detection circuit 30 will indicate the presence of a sticky bit by providing the sticky bit output as a logic high signal. Hence, control portion 32 implements a first level of a distributed NOR function and output portion 33 implements a second level of a distributed NOR function. It should be noted that the sticky bit detction circuit 30 also has a large amount of circuit area in the transistor array which is not efficiently utilized. Particularly, for the same bit size implementation control portion 32 has a width W' similar in value to width W of controlled shift portion 12 of FIG. 1. In addition, due to a differing number of transistors connected to each shift control line in the transistor array of control portion 32, a different load is present on each of the shift control signal lines. The differing loads result in the need for differing drive requirements for each shift control signal.

Figure 3:
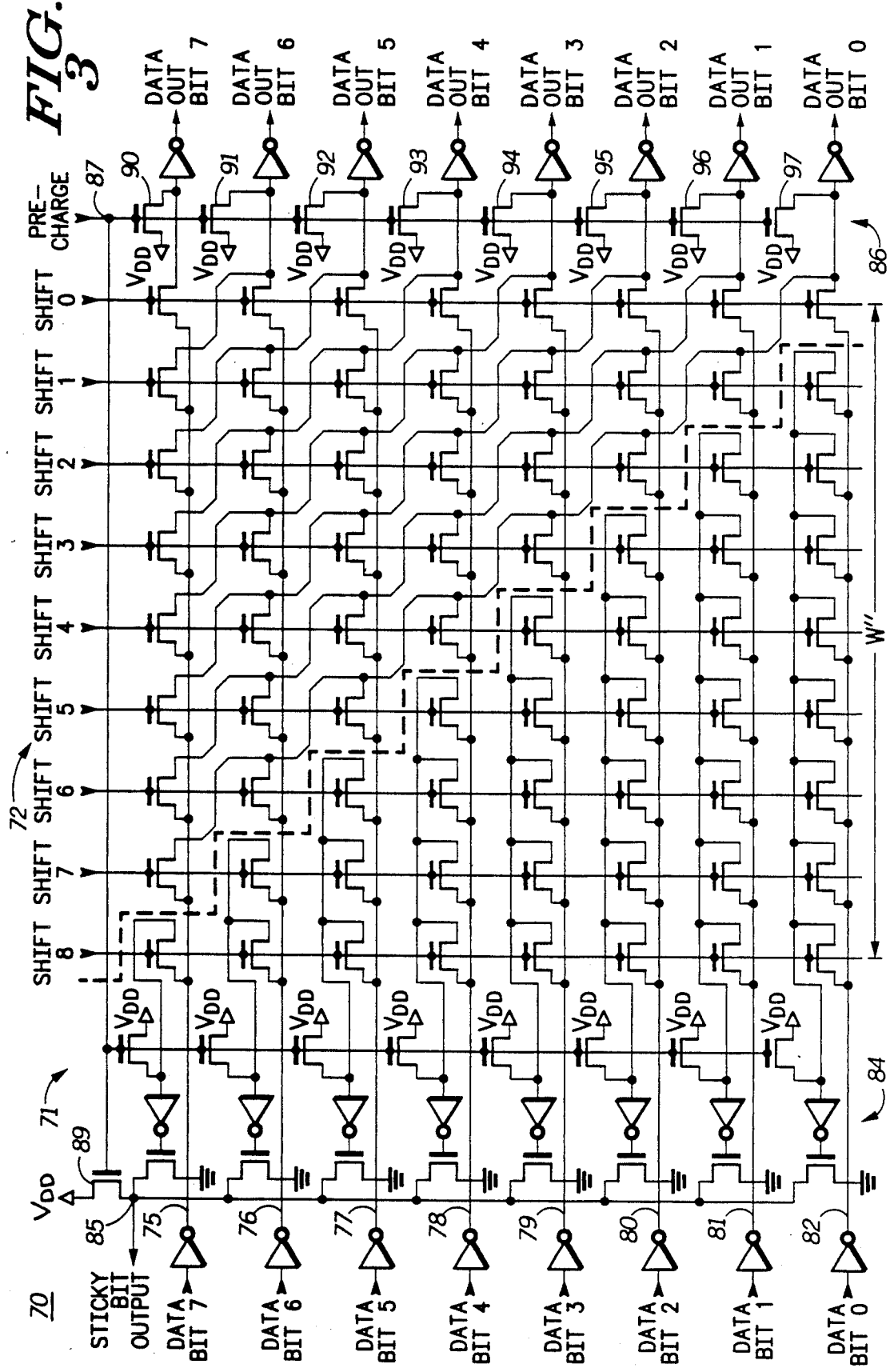
FIG. 3 illustrates in partial schematic form a circuit which concurrently performs the functions of the circuits of FIGS. 1 and 2.

Shown in FIG. 3 is a sticky bit detection and shifting circuit 70 which functions to shift a controlled number of bits of a data operand while automatically providing a sticky bit indication signal. Circuit 70 generally comprises a sticky bit detection portion 71 and a shifting portion 72 separated by the dashed line. Although circuit 70 is illustrated as being implemented by N-channel MOS transistors it should be readily apparent that the present invention may be implemented with other types of transistors in different electronic processes and with opposite conductivities. It should be noted that instead of having separate data and control inputs for each of the sticky bit detect and data shift functions, detection portion 71 and shifting portion 72 share the same shift control lines and input data bit lines 75–82 which are respectively buffered from input data bits 7–0 by an inverter, not numbered. Sticky bit detection portion 71 has an output section 84 with an output node 85, and shifting portion 72 has an output section 86 with a precharge control line 87. Output node 85 has an N-channel transistor 89 having a drain connected to a positive supply voltage $V_{DD}$, a source connected to output node 85 and a gate connected to a Precharge signal.

In operation, the Precharge signal is connected to each of output section 84 and output node 85. The Precharge signal functions to initially place a logic high signal at output node 85 by making transistor 89 conductive. The Precharge signal also makes each of transistors 90–97 of output section 86 conductive, thereby forcing all of the data output bits labeled "7" thru "0" to a logic zero. After the Precharge signal becomes inactive, eight data bits are presented to circuit 70 and a single shift control signal is asserted. In response thereto, the input data operand is either not shifted and presented at the data outputs or shifted a controlled number of bit positions by shifting portion 72. For example, when the "shift 4" control signal is asserted, data bits 3, 2, 1 and 0 are not coupled to any of the data output terminals of output section 86 by shifting portion 72. Instead, shifting portion 72 couples input data "bit 4" to the data output terminal as output data "bit 0" thru the transistor which is at the intersection of the row of transistors defined by data "bit 4" and the column of transistors defined by the "shift 4" control signal. Concurrently, data bits 3, 2, 1 and 0 which have been shifted off of the output data operand are tested for a logic one value by detection portion 71. If any of the data bits 3, 2, 1 or 0 has a logic one value, output node 85 is caused to be pulled to a ground or logic low value by output section 84. Output section 84 performs a second level NOR function and detection portion 71 performs a first level NOR function. The present invention also may be implemented with equivalent logic such as with distributed OR functions. As a result of the functioning of output section 84, the sticky bit output signal changes logic value when indicating that a sticky bit does exist within the bits which were shifted off from the output data bits.

It should be noted that circuit 70 has the same number of data bit inputs and shift control inputs as each of circuits 10 and 30 rather than double the number. Sticky bit detection is automatically performed concurrently with the shifting operation so that no additional time is required after the shifting operation is complete to complete sticky bit detection. In addition, gate propagation delays between the data inputs and outputs are minimized, even for large bit size implementations. A very desirable improvement provided by the present invention in addition to the efficient speed performance is the minimization of area required to implement circuit 70. Shown in FIG. 3 is a width W" of the transistor array comprising both detection portion 71 and shifting portion 72. While the same scale is not implied between all three figures, the width W" is substantially equivalent in value to either the width W or width W" for the same bit size implementation. The actual amount of silicon area required to implement circuit 70 is practically equivalent to the area required to implement data shifting circuit 10. The combination of sticky bit detection and shifting by a single circuit results in a very size efficient circuit and layout. Further, unlike previous circuits, the same load exists on each of the shift control lines so that a driver circuit has a substantially constant load to drive regardless of the shift selection. The modular nature of the layout and circuitry of circuit 70 improves manufacturing testing and reliability.

While there have been described hereinabove the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

I claim:

1. A sticky bit detection and shifting circuit comprising:
    a plurality of data input terminals for receiving an input operand having a first predetermined number of bits;
    a plurality of control terminals, each of which receives one of a plurality of control signals, each control signal defining a shift number within a predetermined range of bit positions of the input operand to be shifted;
    first means coupled to both the plurality of data input terminals and the plurality of control terminals, said first means providing an output detect signal indicating detecting an existence of any bit having a predetermined logic value within the bit positions of the input operand which are shifted; and
    second means coupled to the first means, to the plurality of data input terminals and the plurality of control terminals, for providing a shifted output data operand derived from the input operand by selectively shifting a bit or bits off of the input operand in response to the received control signal, said output detect signal being provided within a time period required to provide the shifted output data operand,
    the first and second means further comprising a plurality of transistors forming X rows and Y columns, where X and Y are integers, X being equal to the first predetermined number of bits and Y being equal to all shift values within the predetermined range of bit positions, each transistor within each of said X rows having a current electrode connected together and coupled to a predetermined data input terminal and having a control electrode coupled to a predetermined one of the control terminals.

2. The sticky bit detection and shifting circuit of claim 1 wherein said plurality of transistors comprises a plurality of N-channel MOS transistors.

3. The sticky bit detection and shifting circuit of claim 1 wherein said second means further comprise:
precharging means for initially charging all bits of the output data operand to a predetermined logic state before providing the shifted output data operand.

4. The sticky bit detection and shifting circuit of claim 1 wherein the predetermined logic value the first means is detecting is a logic one value.

5. A method of using a circuit to concurrently shift one or more bits of a multi-bit operand and detect any 'sticky' bits having a predetermined logic value among bits which are removed from said operand as a result of said shifting, comprising the steps of:
providing a plurality of data input terminals for receiving an input operand having a first predetermined number of bits;
providing a plurality of control terminals for receiving a control signal defining a shift number within a predetermined range of bit positions of the input operand to be shifted;
providing a plurality of transistors forming X rows and Y columns, X and Y being integers, X being equal to the first predetermined number of bits and Y being equal to all shift values within the predetermined range of bit positions, each transistor within each of the X rows having a current electrode connected together and coupled to a predetermined data input terminal and having a control electrode coupled to a predetermined one of the control terminals; and
providing a shifted output data operand derived from the input operand by shifting bits of the input operand the defined number of bit positions, while concurrently also providing an output 'sticky' bit detect signal indicating an existence of any bit which is shifted away from the input operand which has a predetermined logic value, said 'sticky' bit detect signal being provided within a time period required to provide the shifted output data operand.

6. The method of claim 5 further comprising the step of:
before providing the shifted output data operand, precharging all bits of the output data operand to a predetermined logic value.

7. A method of concurrently shifting a predetermined number of bits of a multi-bit operand and detecting any 'sticky' bits having a predetermined logic value among bits which are discarded from the operand as a result of the shifting, comprising the steps of:
providing a plurality of data input terminals for receiving an input operand having a first predetermined number of bits;
providing a plurality of control terminals, each of which receives one of a plurality of control signals, each control signal defining a shift number within a predetermined range of bit positions of the input operand to be shifted;
providing a plurality of transistors forming X rows and Y columns, where X and Y are integers, X being equal to the first predetermined number of bits and Y being equal to all shift values within the predetermined range of bit positions, each transistor within each of said X rows having a current electrode connected together and coupled to a predetermined data input terminal and a control electrode coupled to a predetermined one of the control terminals, the plurality of transistors providing an output detect signal indicating detecting an existence of any bit having a predetermined logic value within any bit positions of the input operand which are shifted while also providing a shifted output data operand derived from the input operand;
arranging the X rows and Y columns of transistors within a substantially rectangular layout region;
placing a first portion of the X rows and Y columns of transistors in substantially a first half of the rectangular layout region, said first portion functioning primarily to detect 'sticky' bits; and
placing a second portion of the X rows and Y columns of transistors in substantially a second half of the rectangular layout region, said second portion functioning primarily to shift one or more bits of the multi-bit operand and being separated from the first portion substantially along a diagonal of the rectangular layout region.

* * * * *